(12) United States Patent
Nakamura

(10) Patent No.: US 8,696,037 B2
(45) Date of Patent: Apr. 15, 2014

(54) CONNECTOR FOR PIPE CONNECTION

(75) Inventor: Takaaki Nakamura, Yokohama (JP)

(73) Assignee: NIFCO Inc., Yokohama-shi (JP)

( * ) Notice: Subject to any disclaimer, the term of this patent is extended or adjusted under 35 U.S.C. 154(b) by 0 days.

(21) Appl. No.: 13/138,733

(22) PCT Filed: Mar. 18, 2010

(86) PCT No.: PCT/JP2010/001951
§ 371 (c)(1),
(2), (4) Date: Dec. 12, 2011

(87) PCT Pub. No.: WO2010/109828
PCT Pub. Date: Sep. 30, 2010

(65) Prior Publication Data
US 2012/0080880 A1    Apr. 5, 2012

(30) Foreign Application Priority Data

Mar. 23, 2009    (JP) .................................. 2009-070657

(51) Int. Cl.
*F16L 37/18*    (2006.01)

(52) U.S. Cl.
USPC ............................ 285/315; 285/314; 285/319

(58) Field of Classification Search
USPC .................... 285/314, 315, 316, 319
See application file for complete search history.

(56) References Cited

U.S. PATENT DOCUMENTS

| | | | |
|---|---|---|---|
| 3,569,903 A * | 3/1971 | Brishka | 285/315 |
| 4,219,222 A * | 8/1980 | Brusadin | 285/315 |
| 4,660,803 A * | 4/1987 | Johnston et al. | 285/315 |
| 4,681,350 A * | 7/1987 | Gaita | 285/315 |
| 4,903,942 A * | 2/1990 | Licciardello et al. | 285/319 |
| 5,131,687 A * | 7/1992 | Marchou | 285/319 |
| 5,511,827 A | 4/1996 | Steinkamp et al. | |
| 5,758,905 A | 6/1998 | Hama et al. | |
| 5,823,508 A | 10/1998 | Nie | |
| 5,890,749 A | 4/1999 | Fukaya et al. | |
| 6,173,998 B1 | 1/2001 | Bock | |
| 6,199,920 B1 * | 3/2001 | Neustadtl | 285/319 |

(Continued)

FOREIGN PATENT DOCUMENTS

| | | |
|---|---|---|
| CN | 1036629 A | 10/1989 |
| EP | 0511436 A1 | 11/1992 |

(Continued)

OTHER PUBLICATIONS

Europe Patent Office, "European Search Report for EP 10755631.8," Feb. 4, 2014.

*Primary Examiner* — David E Bochna
(74) *Attorney, Agent, or Firm* — Manabu Kanesaka

(57) ABSTRACT

A connector for pipe connection provided to stably hold a state of connection of a pipe, and to improve operability by a user when disconnecting the pipe. The connector (1) for pipe connection has a connector body (3) in which a pipe (2) is inserted and removed; a lock member (4) held slidably in the connector body for fastening the pipe by locking pieces (42) and (42); and operating pieces (43) and (43) provided for operating to slide the lock member; and is configured such that the locking piece is elastically deformed from a fastened state in which the pipe is fastened to a released state in which the pipe is released by being pressed against a pressing part (55) formed on the connector body when the lock member is operated to slide.

9 Claims, 10 Drawing Sheets

(56) References Cited

U.S. PATENT DOCUMENTS

| | | | | |
|---|---|---|---|---|
| 6,467,816 | B1 * | 10/2002 | Huang | 285/316 |
| 6,767,034 | B2 * | 7/2004 | Le Clinche | 285/319 |
| 6,983,959 | B2 * | 1/2006 | Wolf et al. | 285/314 |
| 7,318,609 | B2 * | 1/2008 | Naito et al. | 285/316 |
| 7,690,694 | B2 * | 4/2010 | Poder | 285/314 |
| 2003/0155767 | A1 | 8/2003 | Hardie et al. | |
| 2005/0206161 | A1 | 9/2005 | Ogiso et al. | |

FOREIGN PATENT DOCUMENTS

| | | |
|---|---|---|
| JP | S52-17128 U | 2/1977 |
| JP | S62-177223 U | 11/1987 |
| JP | U S62-177223 | 11/1987 |
| JP | H02-017291 A | 1/1990 |
| JP | H09-152078 A | 6/1997 |
| JP | 2000-310383 A | 11/2000 |
| JP | 2002-022082 A | 1/2002 |
| JP | 3386406 B2 | 1/2003 |

\* cited by examiner ical Field

The present invention relates to a connector for pipe connection for connecting a pipe to an object of connection.

BACKGROUND TECHNOLOGY

There is conventionally known a connector for connecting a plastic hose to a pipe provided on a housing of a radiator of an automobile comprising a cylindrical sleeve to which the hose is connected; and a securing device attached movably between a connected position and a disconnected position on the cylindrical sleeve, and provided with an arm for locking the hose in the connected position (see Patent Document 1).

In this connector, the arm of the securing device is formed so as to bend elastically in a radial direction, and in the case when the securing device is in the connected position, a rib protruding on the outer perimeter surface of the hose is insertion-coupled to a recess on the inside of the radial direction of a hook provided on one end side of the arm, an inclined surface on the outside of the radial direction of the hook contacts with an inner edge (edge on the inside of the radial direction) of a hole on the cylindrical sleeve, and bending to the outside of the radial direction of the arm (that is, releasing of the insertion-coupling of the rib) is prevented. On the other hand, when a user moves the securing device from the connected position to the disconnected position, the contact of the hook of the arm with the hole of the cylindrical sleeve is released by relative movement between the securing device and the cylindrical sleeve, the hook rides past the rib so that the arm is pushed wider to the outside of the radial direction by relative movement between the securing device and the hose, and the insertion-coupling of the rib to the recess of the hook is released.

PRIOR ART DOCUMENTS

Patent Documents

Patent Document 1: Japanese Patent Publication No. 3107085

OUTLINE OF THE INVENTION

Problems to be Solved by the Invention

However, because the abovementioned conventional connector is configured such that the hook rides over the rib so that the arm is pushed wider to the outside of the radial direction when disconnecting, there is a problem that the user required a great operating force and the operability was poor. Furthermore, with the abovementioned conventional connector, there is also a problem that the state of coupling with the hose can no longer be held when deformation or damage is caused to the bending of the hook or to the rib by repetitive performance of connecting and disconnecting operations.

The present invention is proposed in consideration of such problems of the prior art, and an object is to provide a connector for pipe connection, in which the state of connection of the pipe can be held stably when connected, and in which the operability by a user is improved when disconnecting the pipe.

Means for Solving the Problems

A first invention created to solve the abovementioned problems is a connector (1) for pipe connection for connecting a pipe (2) to an object of connection, comprising a connector body (3) in which said pipe is inserted and removed; a lock member (4) held slidably on said connector body for fastening said pipe by locking pieces (42 and 42); and operating pieces (43 and 43) provided for operating to slide said lock member; and being configured such that said locking piece is elastically deformed from a fastened state in which said pipe is fastened to a released state in which the pipe is released by being pressed against a first pressing part (55) formed on said connector body when said lock member is operated slidably.

Also, a second invention can be configured such that said locking piece extends to an inserting direction of said pipe from a base part (41) of said lock member, and is elastically deformed to said released state by a free end side thereof riding over the first pressing part of said connector.

Also, a third invention can be configured such that said locking piece has a first restricting part (53) for restricting a movement toward a releasing direction of said pipe when in said fastened state; and a second restricting part (51) for restricting elastic deformation from said fastened state to said released state by contacting with a contact part (52) formed on said connector body.

Also, a fourth invention can be configured such that said operating piece is placed extending in a direction of insertion of said pipe from a base part of said lock member, and is elastically deformed by effect of a free end side thereof riding over a second pressing part (24) formed on said connector body, in the case when said locking piece is in the released state.

Also, a fifth invention can be configured such that a base part of said lock member has a ring form; and said locking piece and said operating piece extend away from each other in a circumferential direction of the base part of said lock member, said locking piece is disposed inside said connector body, and said operating piece is disposed outside said connector body.

Also, a sixth invention can be configured such that a coupling hole (23) for coupling with said locking piece is provided on said connector body; and said locking piece projects to the outside of said connector body from said coupling hole when beingelastically deformed to said released state.

Also, a seventh invention can be configured such that said first pressing part is formed on an edge of an opening of said coupling hole.

Effects of the Invention

According to the abovementioned first invention, because the configuration is such that the locking piece of the lock member operated to slide is elastically deformed from the fastened state to the released by being pressed against the first pressing part formed on the connector body, there are notable effects that the state of connection of the pipe is held stably when the pipe is connected, and a favorable operability is obtained without the user requiring a great operating force to pull out the pipe.

Also, according to the abovementioned second invention, the locking piece can be elastically deformed easily on the free end side (that is, the place for locking the pipe) so as to be moved away from the pipe when the lock member is operated slidably. Also, because the elastic recovery force of the locking piece acts as a force causing the lock member to slide to the side putting the locking piece in the fastened state, a favorable operability is obtained without the user requiring a great operating force to slide the lock member.

Also, according to the abovementioned third invention, because elastic deformation of the locking piece is restricted (that is, a release of the restriction by the first restricting part is prevented) by the second restricting part in the state in which a movement toward the releasing direction of the pipe is restricted by the first restricting part when the locking piece is in the fastened state, the state of connection of the pipe can be held more stably.

Also, according to the abovementioned fourth invention, because the elastic recovery force of the operating piece acts as a force causing the lock member to slide to the side putting the locking piece in the fastened state, a favorable operability can be obtained without the user requiring a great operating force to slide the lock member. Also, because the elastic recover force of the operating piece acts so as to always return the lock member to the position when the locking piece is in the initial state, a creep phenomenon caused by keeping the locking piece in the elastically deformed state can be prevented.

Also, according to the abovementioned fifth invention, the locking piece and the operating piece of the lock member can be realized by a simple and compact configuration.

Also, according to the abovementioned sixth invention, the locking piece can be elastically deformed to the released state without complicating the configuration of the connector body and the lock member.

Also, according to the abovementioned seventh invention, the first pressing part can be realized easily without complicating the configuration of the connector body.

EMBODIMENT OF THE INVENTION

The connector for pipe connection according to an embodiment of the present invention is described below while referring to FIGS. 1 to 10. In the following discussion, the terms, "up," "down," "front," "rear," "left," and "right," indicating direction, are defined following the directions illustrated in FIG. 1, unless specifically stated otherwise. For example, the direction of insertion (direction of arrow A) following the axis of the pipe 2 into the connector 1 illustrated in FIG. 1 corresponds to "forward," and the opposite direction corresponds to "rearward."

The connector for pipe connection (hereinafter simply referred to as "connector") 1 is used for connecting a pipe 2 for fluid transport to an object of connection (not illustrated), and is configured mainly with a connector body 3 in which the pipe 2 is inserted and removed, and a lock member 4 held slidably in the connector body 3 for fastening the pipe 2 in accordance with a sliding movement thereof, as illustrated in FIGS. 1 to 4.

Figure 1:
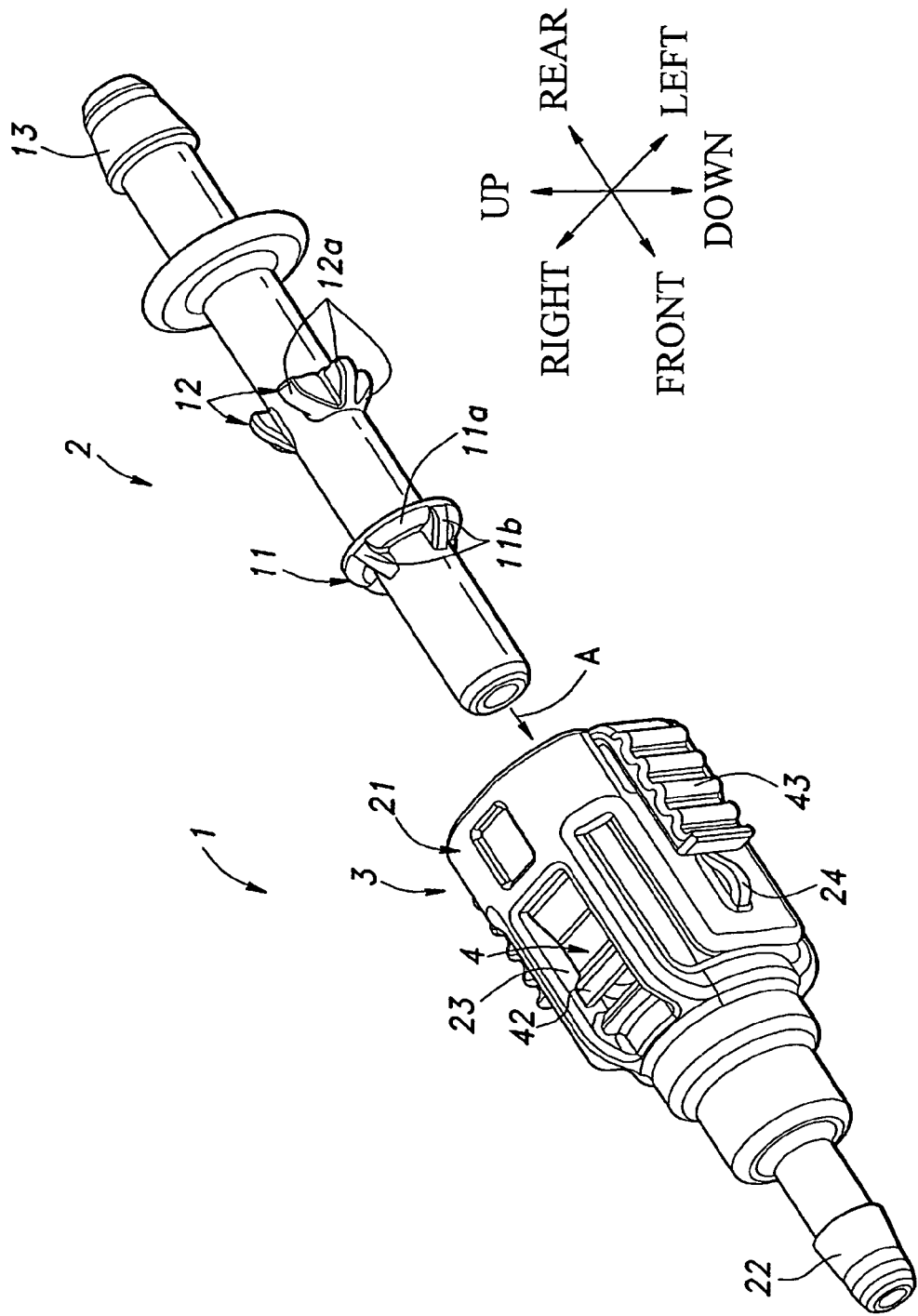
FIG. 1 is a perspective view of the connector for pipe connection according to an embodiment.

The pipe 2 has a flange part 11 on the front side to be locked to the lock member 4, a pair of protruding parts 12 for preventing rattling provided to the rear of the flange part 11, and a hose connection part 13 provided on the rear end, as illustrated in FIG. 1. The flange part 11 has an annular part 11a, and a plurality of rib parts 11b arranged at an equal spacing in the circumferential direction on the front side of the annual part 11a, and the front face of each rib part 11b is inclined toward the rear from the outer perimeter surface of the pipe 2. Each protruding part 12 respectively has three protrusions 12a. A hose for fluid transport (not illustrated) is connected to the hose connection part 13.

Figure 2:
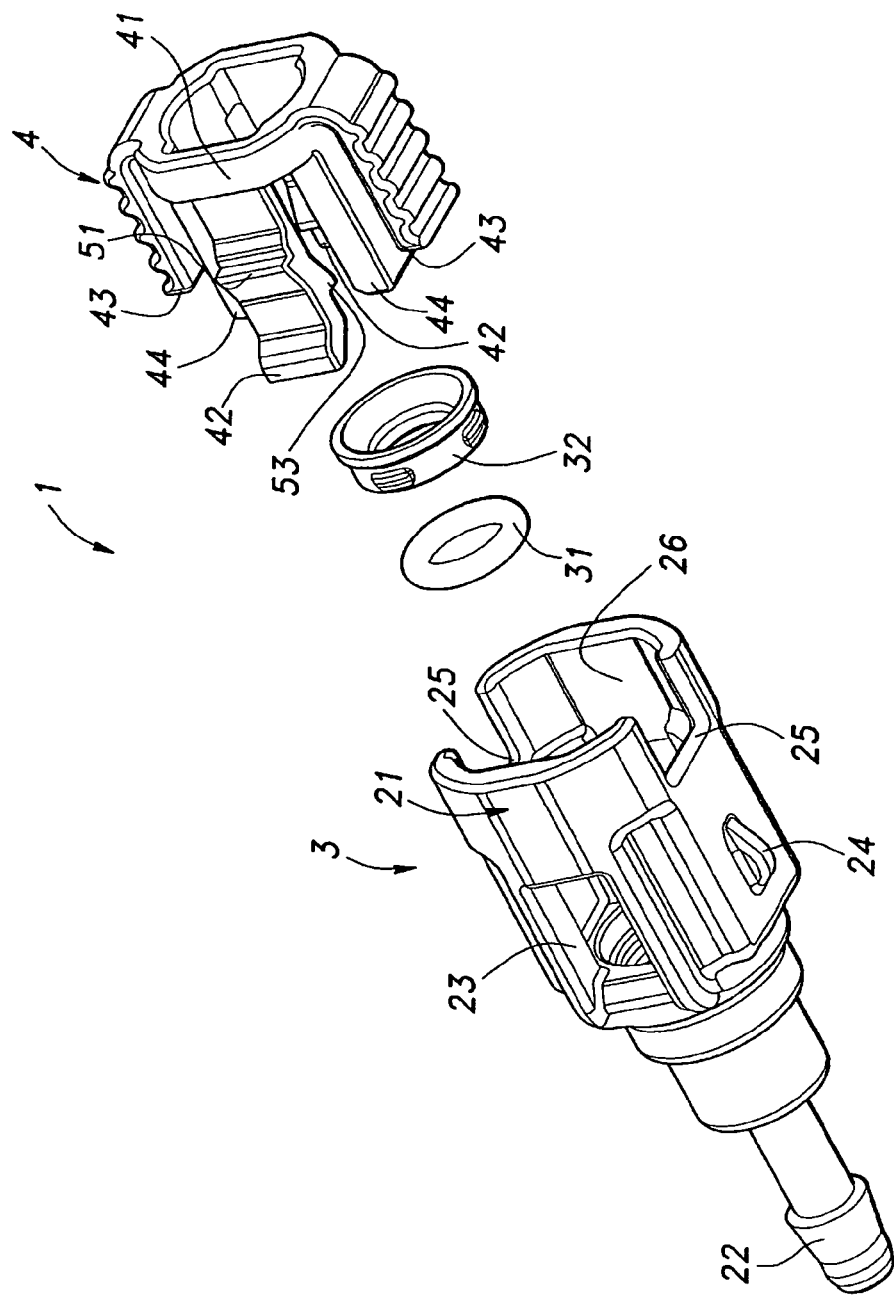
FIG. 2 is an exploded perspective view of the connector for pipe connection according to the embodiment.
Figure 3:
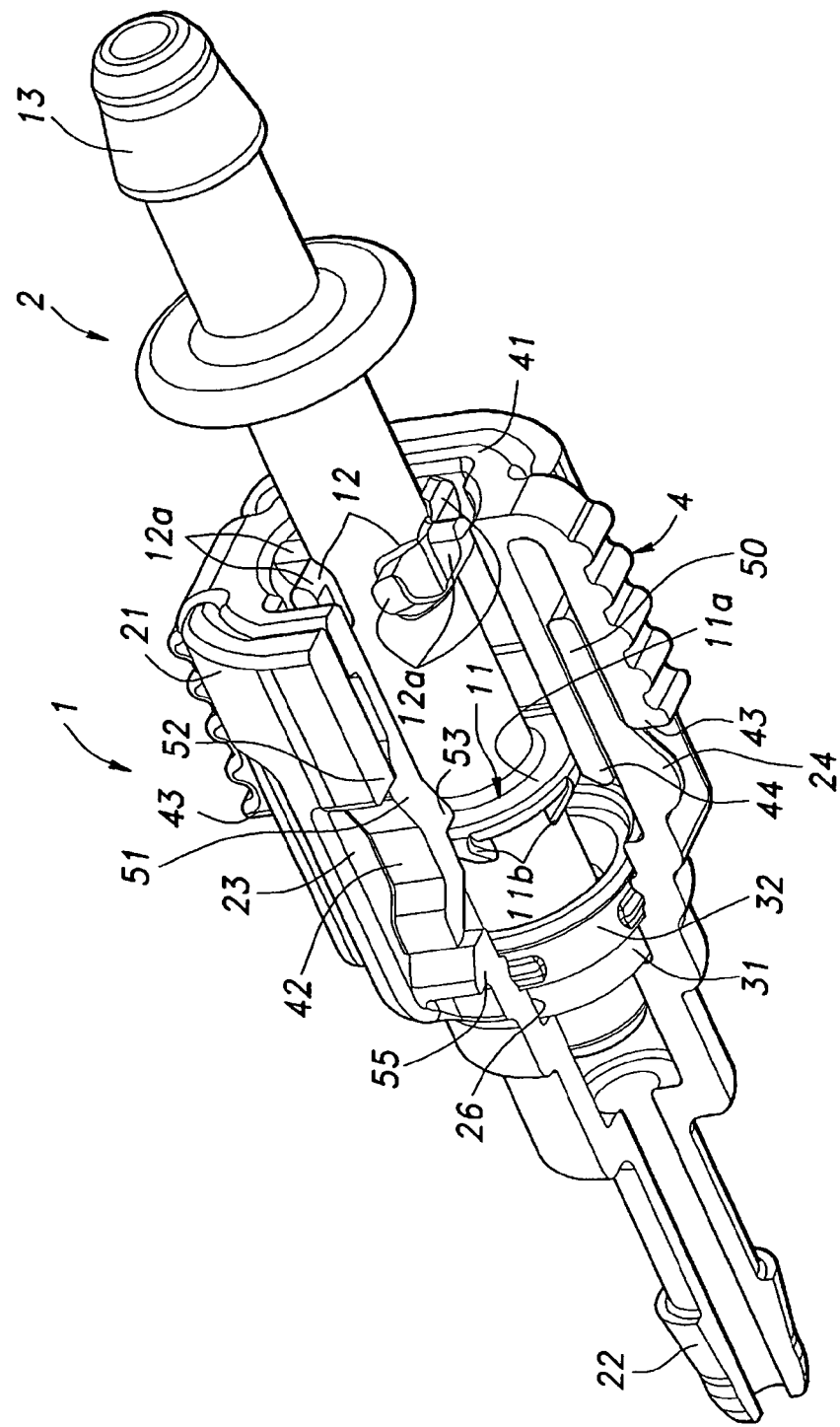
FIG. 3 is a partial cross-sectional view from perspective angle of the connector for pipe connection according to the embodiment.
Figure 4:
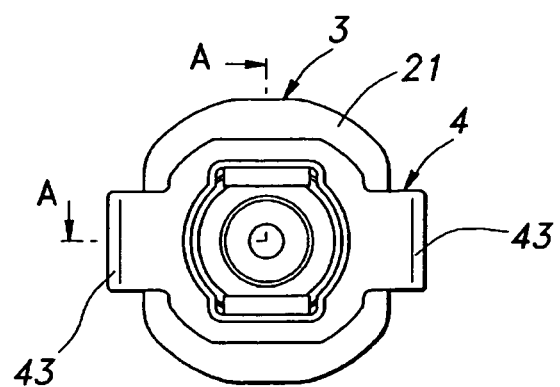
FIG. 4 is a rear view of the connector for pipe connection according to the embodiment.

The connector body 3 is made with a synthetic resin material, and has a tube part 21 on the rear side in which the lock member 4 is received, and a hose connection part 22 provided on the front end of the tube part 21, as illustrated in FIG. 2. The connector body 3 has a roughly symmetrical shape top to bottom and left to right. The tube part 21 has openings 23 formed respectively on the upper and lower walls, and pressing parts 24 are placed protruding toward the outside on the left and right walls. Also, cutouts 25 in which base end parts of operating pieces 43 and 43 (places connected with a ring part 41) are insertion-coupled are formed on the rear edges of the left and right walls, as illustrated in FIG. 3. A hose for fluid transport (not illustrated) to be the object of connection of the pipe 2 is connected to the hose connection part 22. An O-ring 31 for sealing a channel, and a cylindrical bush 32 for fastening the O-ring 31 in an insertion hole 26 of the connector 1 in which the pipe 2 is inserted and removed are installed in the insertion hole 26, as illustrated also in FIG. 6.

The lock member 4 is made with a synthetic resin material, and has an annular ring part 41 forming a base part thereof, a pair of top and bottom locking pieces 42 and 42 extending forward from the ring part 41, a pair of left and right operating pieces 43 and 43 extending forward from the ring part 41, and left and right guide pieces 44 and 44 extending forward from the ring part 41 on the inside of the operating pieces 43 and 43, as illustrated in FIG. 2. The locking pieces 42 and 42 are disposed in positions roughly in the middle of spaces between the operating pieces 43 and 43, and have an outer locking claw 51 projecting from the outer face thereof, and an inner locking claw (first restricting part) 53 projecting from the inner face thereof. The operating pieces 43 and 43 are for a user to grip with fingers to perform a sliding movement of the lock member 4, and the outer face thereof presents a rippled form for preventing slipping off. Also, the guide pieces 44 and 44 are respectively disposed opposite the operating pieces 43 and 43, with a spacing equal to the thickness of the left and right walls of the tube part 21 on the connector body 3.

In the state in which the lock member 4 was received in the connector body 3, the locking pieces 42 and 42 are disposed on the inside of the connector body 3, and the front end sides thereof are exposed from the openings 23 on the connector body 3, as illustrated in FIG. 3. Also, the lock member 4 is in a state in which gripped parts 50 to the rear of the pressing parts 24 on the left and right walls of the tube part 21 are gripped by the operating pieces 43 and 43 and the guide pieces 44 and 44 respectively disposed on the outside and the inside of the connector body 3. Rattling of the lock member 4 during sliding movement, or the like, is thereby prevented.

Figure 5:
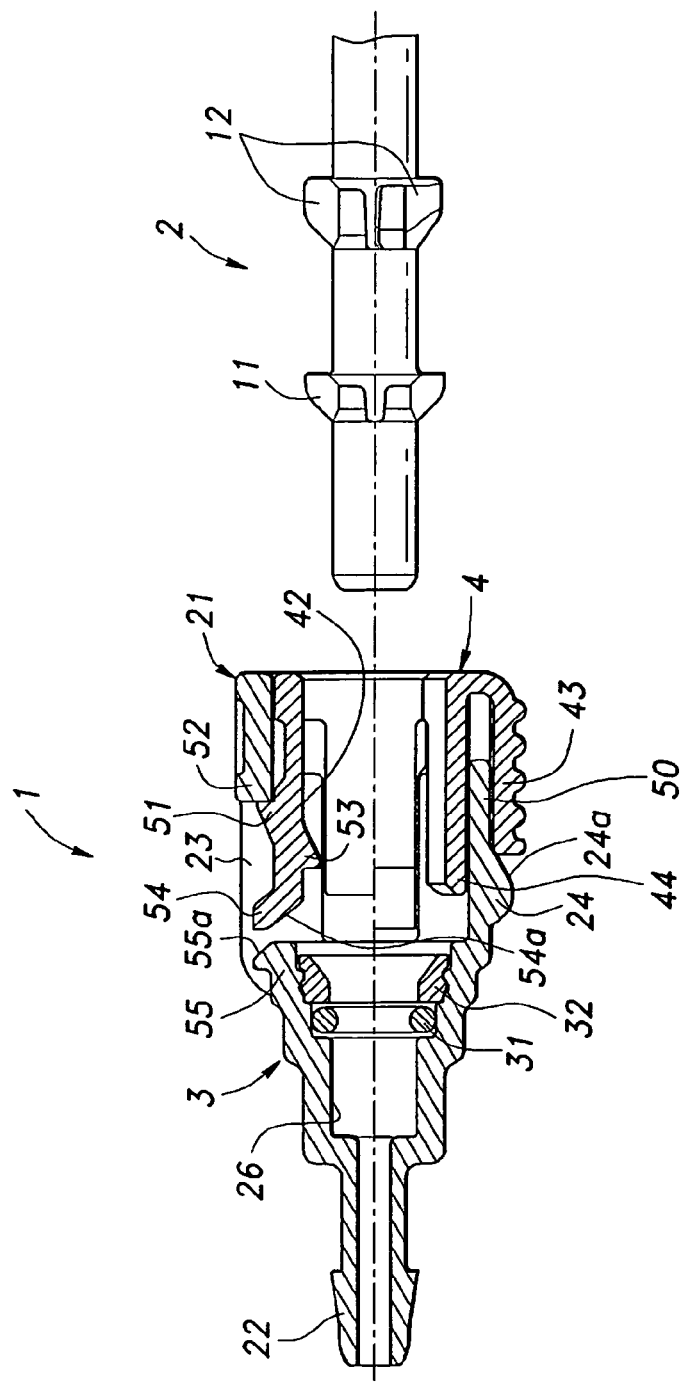
FIG. 5 is a cross-sectional view along the line A-A in FIG. 4 showing one state of operation of the connector for pipe connection according to the embodiment.
Figure 6:
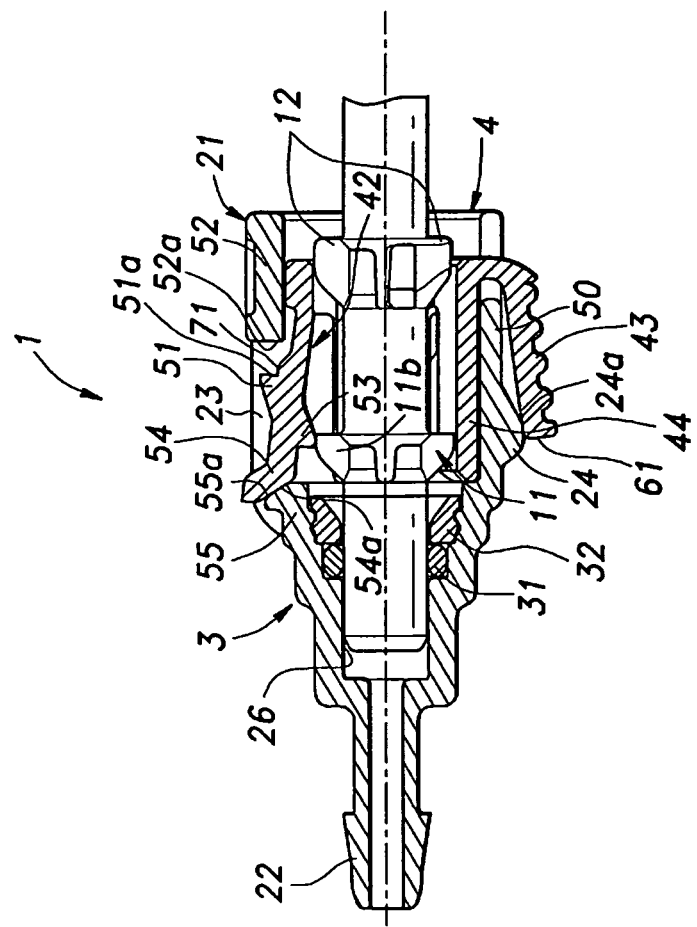
FIG. 6 is a cross-sectional view along the line A-A in FIG. 4 showing one state of operation of the connector for pipe connection according to the embodiment.
Figure 7:
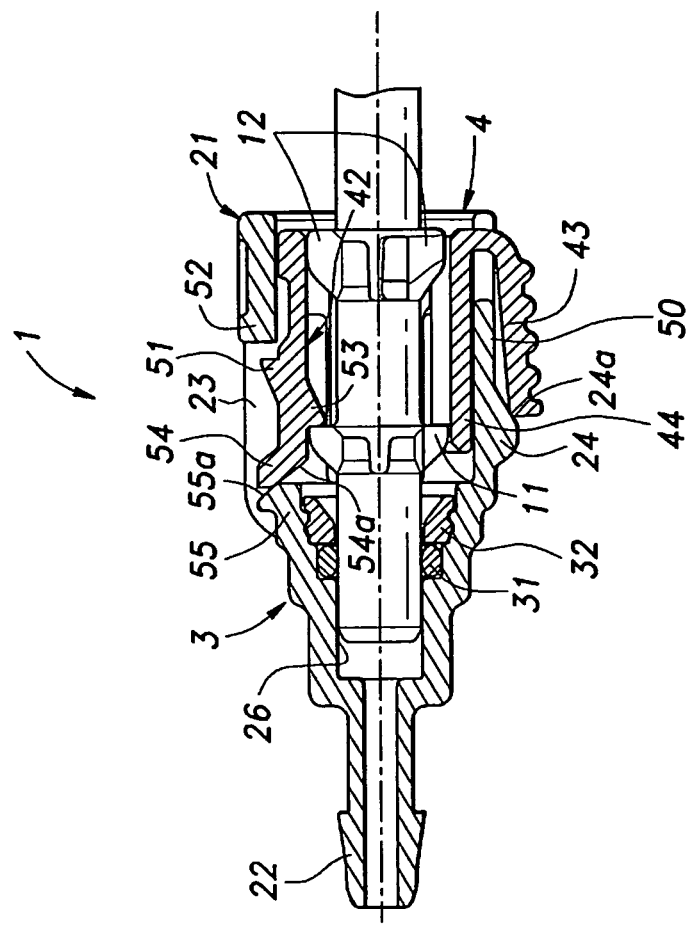
FIG. 7 is a cross-sectional view along the line A-A in FIG. 4 showing one state of operation of the connector for pipe connection according to the embodiment.
Figure 8:
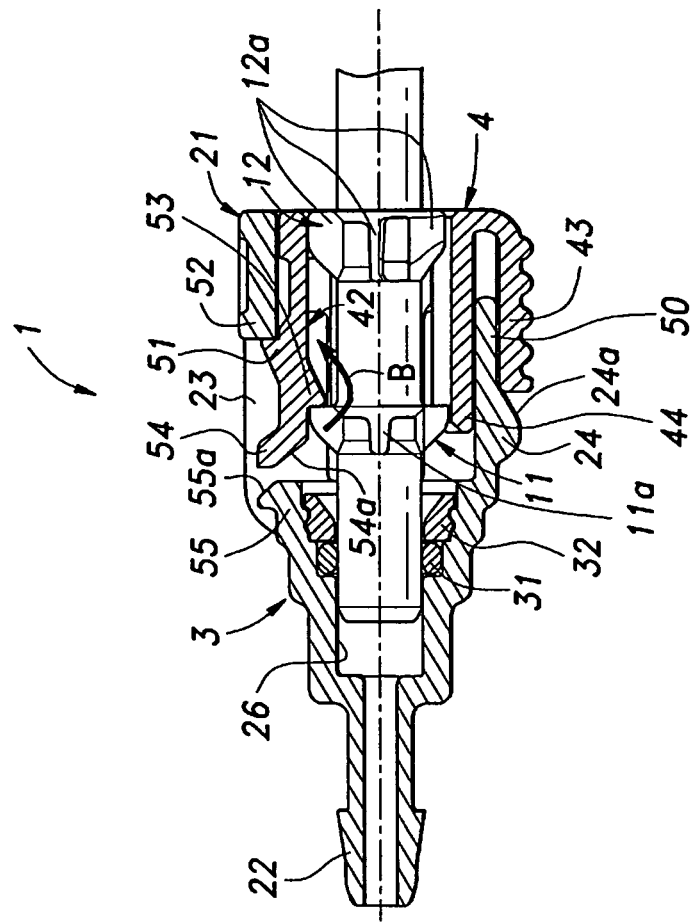
FIG. 8 is a cross-sectional view along the line A-A in FIG. 4 showing one state of operation of the connector for pipe connection according to the embodiment.
Figure 9:
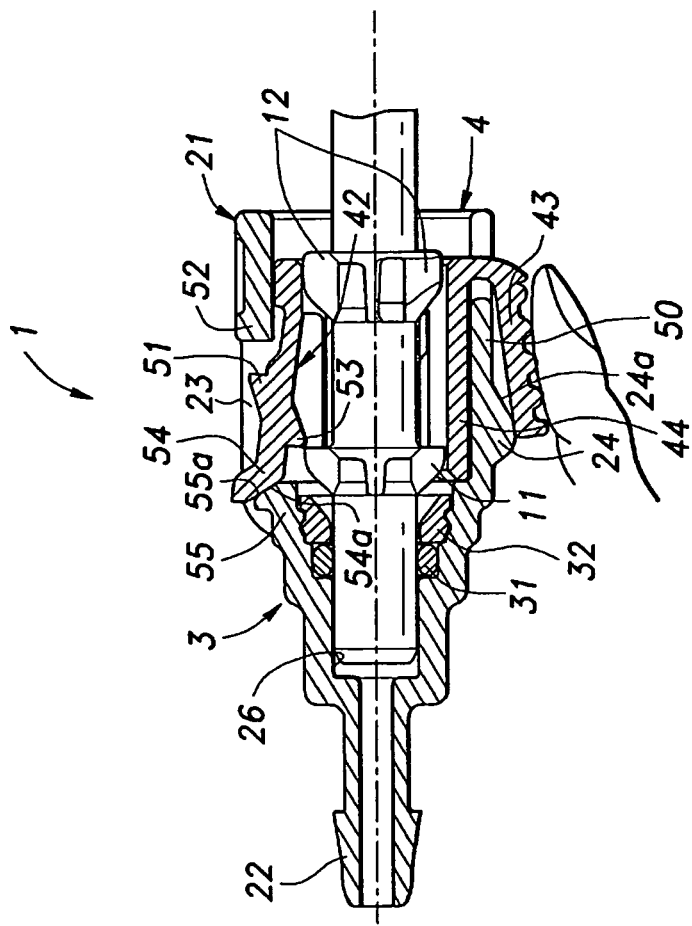
FIG. 9 is a cross-sectional view along the line A-A in FIG. 4 showing one state of operation of the connector for pipe connection according to the embodiment.
Figure 10:
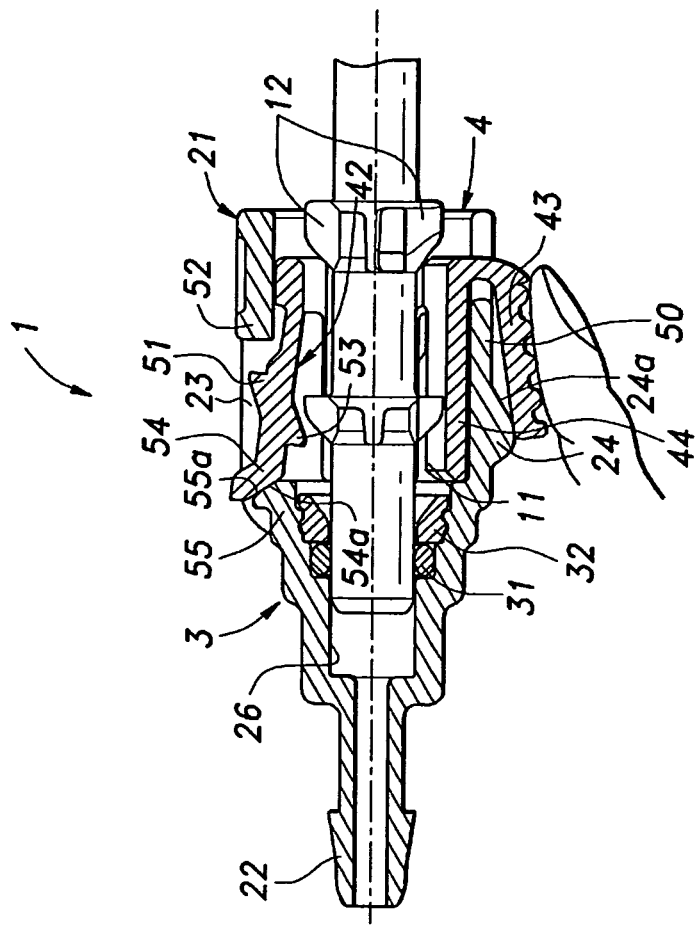
FIG. 10 is a cross-sectional view along the line A-A in FIG. 4 showing one state of operation of the connector for pipe connection according to the embodiment.

Details of the operation for joining the connector 1 and the pipe 2 having the abovementioned configuration are next described. FIGS. 5 to 10 illustrate a series of states of operation for joining the pipe 2 to the connector 1 and then undoing that joining. Here, FIG. 5 illustrates a state before the pipe 2 is joined, FIGS. 6 to 8 illustrate states leading up to completion of joining of the pipe 2, and FIGS. 9 and 10 illustrate states leading up to undoing of the joining of the pipe 2.

In the connector 1 before the pipe 2 is joined, as illustrated in FIG. 5, the locking pieces 42 and 42 of the locking member are in an initial state not being elastically deformed, and a rear face 51a (see FIG. 6) of the outer locking claw 51 is in a state of contact with a front face 52a (see FIG. 6) of the contact part 52 defining the rear edge of the opening 23 of the connector 1. The lock member 4 is thereby restricted in movement to the rear, and is held stably in the retracted position illustrated in FIG. 5. Also, the operating pieces 43 and 43 of the lock member are likewise in an initial state not being elastically deformed, and the front end thereof contacts with a root portion of a rear end side of the pressing part 24 placed protruding from the connector body 3.

Next, as illustrated in FIG. 6, the pipe 2 inserted into the insertion hole 26 of the connector body 3 moves forward in a state in which the inclined front face of the rib part 11b on the flange part 11 is in sliding contact with an inclined rear face of the inner locking claw 53 of the locking pieces 42 and 42 on the lock member 4. The lock member 4 thereby slides forward, and the locking pieces 42 and 42 are pressed from the inside by the flange part 11 of the pipe 2, and are gradually elastically deformed to spread outward.

Also, at this time, the locking pieces 42 and 42 of the lock member 4 move forward in a state in which a front end part 54 bending diagonally toward the outside (upper side in FIG. 5) is in sliding contact with an upper face 55a of the pressing part (first pressing part) 55 defining the front edge of the opening 23 of the connector 1. The upper face 55a of the pressing part 55 is inclined diagonally upward and forward at an angle roughly equal to that of a front face 54a of the front end part 54. The locking pieces 42 and 42 are thereby elastically deformed so that the front end side (free end side) thereof rides over the pressing part 55.

Furthermore, at this time, the operating pieces 43 and 43 of the lock member 4 move forward in a state in which a front end part 61 thereof is in sliding contact with a rear face 24a of the pressing part (second pressing part) 24 inclined diagonally downward and forward. The operating pieces 43 and 43 are thereby elastically deformed so that the front end side (free end side) thereof rides over the pressing part 24.

Thus, because the configuration is such that the lock member 4 slides toward the pressing part 55 by being pressed against the pipe 2 when the pipe 2 is inserted into the connector body 3, there is an advantage that a user can cause the locking pieces 42 and 42 to be elastically deformed to the released state by simply inserting the pipe 2 into the connector body 3, and a favorable operability is obtained.

When the pipe 2 is thereafter further inserted from the state in FIG. 6 and the flange part 11 thereof moves to the front of the inner locking claw 53, the locking pieces 42 and 42 having rode over the pressing part 55 becomes the released state not impeding insertion and removal of pipe 2. At this time, because the elastically deformed locking pieces 42 and 42 are in a state in which the lower face 54a of the front end 54 thereof is in sliding contact with the upper face 55a of the pressing part 55 of the connector 1, the elastic recovery force thereof acts so as to cause the lock member 4 to move rearward. The lock member 4 thereby moves rearward until the elastic deformation of the operating pieces 43 and 43 recovers when the user stops insertion of the pipe 2, as illustrated in FIG. 7.

Also, at this time, the operating pieces 43 and 43 in a state having rode over the pressing part 24 become a state in which the front end part 61 thereof is in sliding contact with the rear face of the pressing part 24 of the connector 3, accompanying the rearward movement of the lock member 4. The elastic recovery force of the operating pieces 43 and 43 thereby acts so as to move the lock member 4 rearward in the same manner as the locking pieces 42 and 42. The deformation of the operating pieces 43 and 43 does not completely recover even after the elastic deformation of the locking pieces 42 and 42 has recovered, as illustrated in FIG. 7. Accordingly, the lock member 4 thereafter comes to move rearward to the retracted position where the elastic deformation of the operating pieces 43 and 43 recovers, as illustrated in FIG. 8. The joining of the pipe 2 to the connector 1 is thereby completed.

In this state of complete joining, the rear surface of the annular part 11a on the flange part 11 of the pipe 2 is in a state of contact with the front face of the inner locking claw 53 of the locking pieces 42 and 42, and movement toward the releasing direction of the pipe 2 is thereby restricted. At this time, the locking pieces 42 and 42 are in the fastened state not being elastically deformed in the same manner as in the initial state illustrated in FIG. 5, and the rear face of the outer locking claw 51 is again in a state of contact with the front face of the contact part 52 of the connector 1. Rearward movement of the lock member 4 fastening the pipe 2 is thereby restricted. Also, at this time, each protrusion 12a on the protruding part 12 of the pipe 2 is in a state of close contact with the inner faces of the locking pieces 42 and 42 or the guide pieces 44 and 44, and rattling of the pipe 2 is thereby prevented.

Also, in this state of complete joining, when a load is applied toward the direction of removal of the pipe 2, a force such as to cause bending toward the direction of arrow B acts on the locking pieces 42. However, because the lock member 4 is in a state in which orthogonal faces, constituted by the rear face 51a (see FIG. 6) of the outer locking claw (second restricting part) 51 of the locking pieces 42 and 42 and a contact surface 71 (see FIG. 6) continuing on a root portion on the rear side of the outer locking claw 51, contact with an angle part on the lower side of the contact part 52 of the connector 1, bending of the locking pieces 42 and 42 is suppressed and the fastened state of the pipe 2 is held stably.

When releasing the state of complete joining illustrated in FIG. 8, the user grips the operating pieces 43 and 43 with fingers and slides the lock member 4 forward together with the pipe 2, as illustrated in FIG. 9. The lock member 4 thereby becomes the released state again as illustrated in FIG. 10, and the user becomes capable of easily pulling out the pipe 2 in the releasing direction. When the user thereafter lets go of the operating pieces 43 and 43, the lock member 4 returns again to the initial state before the pipe 2 was joined, illustrated in FIG. 5, by the elastic recover force of the locking pieces 42 and 42 and the operating pieces 43 and 43, in the same manner as in the cases of FIGS. 7 and 8.

Because the connector 1 having the abovementioned configuration is configured such that the locking pieces 42 and 42 of the lock member 4 having been operated to slide are elastically deformed from the fastened state to the released state by being pressed against the pressing part 55 formed on the connector body 3, there are advantages that the state of connection is held stably when the pipe 2 is connected, and a favorable operability is obtained without the user requiring a great operating force to pull out the pipe 2.

Also, because the configuration is such that the free end side of the locking pieces 42 and 42 rides over the inclined upper face 55a of the pressing part 55 of the connector 1 when the lock member 4 slides, the inner locking claw 53 can be moved easily away from the flange part 11 of the pipe 2; and because the elastic recovery force of the locking pieces 42 and 42 acts as a force causing the lock member 4 to slide rearward, a favorable operability is obtained without the user requiring a great operating force to slide the lock member 4 rearward. Furthermore, because the configuration is such that the free end side of the operating pieces 43 and 43 rides over the inclined rear face 24a of the pressing part 55 of the connector 1 when the lock member 4 slides, the elastic recovery force of the operating pieces 43 and 43 also acts as a force causing the lock member 4 to slide rearward in the same manner as the locking pieces 42 and 42, and the operability by the user is further improved. By such configuration, there is an advantage that a spring or other member for causing the lock member 4 to slide to the retracted position becomes unnecessary, and the number of parts can be reduced.

The present invention was described in detail based on a specific embodiment, but the abovementioned embodiment are only illustrative, and the present invention is not limited to these embodiments. For example, the object of connection of a pipe is not limited to a hose connected to a hose connection part as mentioned above, and depending on the circumstances, the connector body may be provided as a portion of a housing or other portion of a machine that can serve as an object of connection of a pipe, without providing a hose connection part.

EXPLANATION OF THE SYMBOLS

1 Connector
2 Pipe
3 Connector body
4 Lock member
11 Flange part
12 Protruding part
13 Hose connection part
21 Cylindrical part
22 Hose connection part
23 Opening
24 Pressing part
26 Insertion hole
41 Ring part
42 Locking piece
43 Operating piece
44 Guide piece
50 Gripped part
51 Outer locking claw
52 Contact part
53 Inner locking claw
54 Front end part
55 Pressing part
61 Front end part
71 Contact surface

What is claimed is:

1. A connector for pipe connection, comprising:
a connector body in which a pipe is inserted and removed; and
a lock member slidably held on said connector body and including an annular ring part forming a base part, a locking piece extending forward from the ring part for fastening the pipe, and an operating piece extending forward from the ring part, for actuating said lock member;
wherein said locking piece is elastically deformed from a fastened state in which said pipe is fastened to a released state in which the pipe is released by being pressed against a first pressing part formed on said connector body when said lock member is operated slidably, and
wherein said locking piece has a first restricting part for restricting a movement toward a releasing direction of said pipe when in said fastened state; and a second restricting part for restricting elastic deformation from said fastened state to said released state by contacting with a contact part formed on said connector body.

2. A connector for pipe connection according to claim 1, wherein said locking piece extends from the base part of said lock member to an inserting direction of said pipe, and is elastically deformed to said released state by a free end side thereof riding over the first pressing part of said connector.

3. A connector for pipe connection according to claim 1, wherein said locking piece and said operating piece extend away from each other in a circumferential direction of the base part of said lock member, said locking piece is disposed inside said connector body, and said operating piece is disposed outside said connector body.

4. A connector for pipe connection according to claim 3, wherein the connector body includes a coupling hole for coupling with said locking piece; and
said locking piece projects to the outside of said connector body from said coupling hole when elastically deformed to said released state.

5. A connector for pipe connection according to claim 4, wherein said first pressing part is formed on an edge of an opening of said coupling hole.

6. A connector for pipe connection according to claim 1, wherein said locking piece comprises a pair of locking pieces facing each other, and said operating piece comprises a pair of operating pieces facing each other, said locking pieces and said operating pieces being arranged alternately with a space therebetween.

7. A connector for pipe connection according to claim 6, wherein said lock member further includes a pair of guide pieces extending from the ring part and located under the operating pieces to form a space therebetween to which a part of the connector body is located.

8. A connector for pipe connection according to claim 7, wherein said connector body further includes protruding parts protruding outwardly therefrom to incline the operating pieces outwardly when the lock member is moved forward.

9. A connector for pipe connection, comprising:
a connector body in which a pipe is inserted and removed;
a lock member slidably held on said connector body for fastening said pipe by a locking piece; and
an operating piece disposed for operating to slide said lock member;
wherein said locking piece is elastically deformed from a fastened state in which said pipe is fastened to a released state in which the pipe is released by being pressed against a first pressing part formed on said connector body when said lock member is operated slidably, and wherein said operating piece extends from a base part of said lock member to an inserting direction of said pipe, and is elastically deformed at a free end side thereof by riding over a second pressing part formed on said connector body when said locking piece is in the released state.

* * * * *